United States Patent
Gore et al.

(10) Patent No.: US 8,131,568 B2
(45) Date of Patent: Mar. 6, 2012

(54) METHOD AND SYSTEM FOR OPERATING AN INSURANCE PROGRAM TO INSURE A PERFORMANCE BONUS OF A PERSON

(75) Inventors: Adrian Gore, Houghton Estate (ZA); Herschel Phillip Mayers, Johannesburg (ZA)

(73) Assignee: Discovery Holdings Limited, Sandton (ZA)

( * ) Notice: Subject to any disclaimer, the term of this patent is extended or adjusted under 35 U.S.C. 154(b) by 148 days.

(21) Appl. No.: 12/721,619

(22) Filed: Mar. 11, 2010

(65) Prior Publication Data

US 2010/0250281 A1 Sep. 30, 2010

(30) Foreign Application Priority Data

Mar. 11, 2009 (ZA) ................ 2009/01740

(51) Int. Cl.
*G06Q 10/00* (2006.01)
*G06Q 50/00* (2006.01)
*G06Q 40/00* (2006.01)

(52) U.S. Cl. ................ 705/3; 705/2; 705/4
(58) Field of Classification Search .......... 705/2–4
See application file for complete search history.

(56) References Cited

U.S. PATENT DOCUMENTS

| | | |
|---|---|---|
| 4,556,216 A | 12/1985 | Ptikanen |
| 4,699,375 A | 10/1987 | Appelbaum et al. |
| 4,831,526 A | 5/1989 | Luchs et al. |
| 4,837,693 A | 6/1989 | Schotz |
| 4,860,275 A | 8/1989 | Kakinuma et al. |
| 4,975,840 A | 12/1990 | DeTore et al. |
| 5,062,645 A | 11/1991 | Goodman et al. |
| 5,136,502 A | 8/1992 | Van Remortel et al. |
| 5,297,026 A | 3/1994 | Hoffman |
| 5,301,105 A | 4/1994 | Cummings, Jr. |
| 5,324,077 A | 6/1994 | Kessler et al. |
| 5,429,506 A | 7/1995 | Brophy et al. |
| 5,490,260 A | 2/1996 | Miller et al. |
| 5,542,420 A | 8/1996 | Goldman et al. |

(Continued)

FOREIGN PATENT DOCUMENTS

AU 2001/276596 3/2003

(Continued)

OTHER PUBLICATIONS

ATG Customer Success Story: Discovery Health 2006 Art Technology Group, Inc.*

(Continued)

*Primary Examiner* — Neal Sereboff
(74) *Attorney, Agent, or Firm* — Fleit Gibbons Gutman Bongini & Bianco, PL; Paul D. Bianco; Martin Fleit (57) ABSTRACT

A method, information processing system, and computer readable storage medium operate an insurance program to insure a performance bonus of an insured person against an insured event. A set of percentage bonus information is received. The set of performance bonus information indicates a percentage of an annual salary that is received by the insured person as a performance bonus in a predetermined prior period. In addition, a set of health program status information is received and associated with the insured person. At least the set of percentage bonus information and the set of health program status information are used to determine a portion or more of an annual salary of the insured person payable as an insured performance bonus in the event of the insured event.

13 Claims, 3 Drawing Sheets

U.S. PATENT DOCUMENTS

| | | |
|---|---|---|
| 5,549,117 A | 8/1996 | Tacklind et al. |
| 5,550,734 A | 8/1996 | Tarter et al. |
| 5,574,803 A | 11/1996 | Gaborski et al. |
| 5,630,073 A | 5/1997 | Nolan |
| 5,631,828 A | 5/1997 | Hagan |
| 5,655,085 A | 8/1997 | Ryan et al. |
| 5,655,997 A | 8/1997 | Greenberg et al. |
| 5,692,501 A | 12/1997 | Minturn |
| 5,722,418 A | 3/1998 | Bro |
| 5,745,893 A | 4/1998 | Hill et al. |
| 5,752,236 A | 5/1998 | Sexton et al. |
| 5,774,883 A | 6/1998 | Andersen et al. |
| 5,832,467 A | 11/1998 | Wavish |
| 5,867,821 A | 2/1999 | Ballantyne et al. |
| 5,890,129 A | 3/1999 | Spurgeon |
| 5,933,809 A | 8/1999 | Hunt et al. |
| 5,933,815 A | 8/1999 | Golden |
| 5,937,387 A | 8/1999 | Summerell et al. |
| 5,956,691 A | 9/1999 | Power |
| 5,987,434 A | 11/1999 | Libman |
| 5,991,744 A | 11/1999 | Dicresce |
| 6,039,688 A | 3/2000 | Douglas et al. |
| 6,049,772 A | 4/2000 | Payne et al. |
| 6,085,174 A | 7/2000 | Edelman |
| 6,085,976 A | 7/2000 | Sehr |
| 6,108,641 A | 8/2000 | Kenna et al. |
| 6,112,986 A | 9/2000 | Berger et al. |
| 6,151,586 A | 11/2000 | Brown |
| 6,163,770 A | 12/2000 | Gamble et al. |
| 6,230,142 B1 | 5/2001 | Benigno et al. |
| 6,338,042 B1 | 1/2002 | Paizis |
| 6,385,589 B1 | 5/2002 | Trusheim et al. |
| 6,513,532 B2 | 2/2003 | Mault et al. |
| 6,587,829 B1 | 7/2003 | Camarda et al. |
| 6,602,469 B1 | 8/2003 | Maus et al. |
| 6,611,815 B1 | 8/2003 | Lewis et al. |
| 6,862,596 B2* | 3/2005 | Thomsen ................ 709/203 |
| 6,965,868 B1 | 11/2005 | Bednarek |
| 7,319,970 B1 | 1/2008 | Simone |
| 7,380,707 B1 | 6/2008 | Fredman |
| 7,383,223 B1 | 6/2008 | Dilip et al. |
| 7,398,217 B2 | 7/2008 | Lewis |
| 7,624,032 B2 | 11/2009 | Radson |
| 7,630,937 B1 | 12/2009 | Mo et al. |
| 7,685,007 B1* | 3/2010 | Jacobson ..................... 705/4 |
| 7,797,175 B2 | 9/2010 | Luedtke |
| 2001/0037214 A1 | 11/2001 | Raskin et al. |
| 2001/0053984 A1 | 12/2001 | Joyce |
| 2002/0002495 A1 | 1/2002 | Ullman |
| 2002/0013717 A1 | 1/2002 | Ando et al. |
| 2002/0016923 A1 | 2/2002 | Knaus |
| 2002/0029158 A1 | 3/2002 | Wolff et al. |
| 2002/0035486 A1 | 3/2002 | Huyn et al. |
| 2002/0038310 A1 | 3/2002 | Reitberg |
| 2002/0042763 A1 | 4/2002 | Pillay |
| 2002/0049617 A1 | 4/2002 | Lencki et al. |
| 2002/0055859 A1 | 5/2002 | Goodman et al. |
| 2002/0087364 A1 | 7/2002 | Lerner et al. |
| 2002/0103678 A1 | 8/2002 | Burkhalter et al. |
| 2002/0111827 A1 | 8/2002 | Levin et al. |
| 2002/0116231 A1 | 8/2002 | Hele et al. |
| 2002/0138309 A1 | 9/2002 | Thomas |
| 2002/0152097 A1 | 10/2002 | Javors |
| 2002/0184129 A1 | 12/2002 | Arena |
| 2003/0009355 A1 | 1/2003 | Gupta |
| 2003/0028483 A1 | 2/2003 | Sanders et al. |
| 2003/0055767 A1 | 3/2003 | Tamura |
| 2003/0065561 A1 | 4/2003 | Brown |
| 2003/0120521 A1 | 6/2003 | Sherman |
| 2003/0120570 A1 | 6/2003 | Dellinger |
| 2003/0135391 A1 | 7/2003 | Edmundson |
| 2003/0149596 A1 | 8/2003 | Bost |
| 2003/0194071 A1 | 10/2003 | Ramian |
| 2003/0200101 A1 | 10/2003 | Adler |
| 2003/0200142 A1 | 10/2003 | Hicks et al. |
| 2003/0208385 A1 | 11/2003 | Zander |
| 2003/0212579 A1 | 11/2003 | Brown |
| 2003/0233278 A1 | 12/2003 | Marshall |
| 2004/0030625 A1 | 2/2004 | Radson et al. |
| 2004/0039608 A1 | 2/2004 | Mazur |
| 2004/0059608 A1 | 3/2004 | Gore et al. |
| 2004/0088219 A1 | 5/2004 | Sanders et al. |
| 2004/0093242 A1* | 5/2004 | Cadigan et al. ................ 705/4 |
| 2004/0111300 A1* | 6/2004 | Callen et al. ................... 705/4 |
| 2004/0138928 A1 | 7/2004 | Monk |
| 2004/0267570 A1 | 12/2004 | Becker et al. |
| 2005/0010453 A1 | 1/2005 | Terlizzi |
| 2005/0033609 A1 | 2/2005 | Yang |
| 2005/0038679 A1 | 2/2005 | Short |
| 2005/0060209 A1 | 3/2005 | Hill |
| 2005/0071205 A1 | 3/2005 | Terlizzi |
| 2005/0102172 A1 | 5/2005 | Sirmans, Jr. |
| 2005/0131742 A1 | 6/2005 | Hoffman et al. |
| 2005/0222867 A1 | 10/2005 | Underwood |
| 2005/0222877 A1 | 10/2005 | Radson et al. |
| 2005/0222878 A1 | 10/2005 | Radson et al. |
| 2005/0228692 A1 | 10/2005 | Hodgdon |
| 2005/0234742 A1 | 10/2005 | Hodgdon |
| 2005/0240449 A1 | 10/2005 | Radson et al. |
| 2005/0256748 A1 | 11/2005 | Gore et al. |
| 2005/0288971 A1 | 12/2005 | Cassandra |
| 2006/0041454 A1 | 2/2006 | Matisonn et al. |
| 2006/0064320 A1 | 3/2006 | Postrel |
| 2006/0074801 A1 | 4/2006 | Pollard et al. |
| 2006/0129436 A1 | 6/2006 | Short |
| 2006/0143055 A1 | 6/2006 | Loy |
| 2006/0155590 A1* | 7/2006 | Graham ........................ 705/4 |
| 2006/0218011 A1 | 9/2006 | Walker et al. |
| 2006/0218023 A1 | 9/2006 | Conrad |
| 2007/0050215 A1 | 3/2007 | Kil |
| 2007/0050217 A1 | 3/2007 | Holden, Jr. |
| 2007/0061237 A1 | 3/2007 | Merton |
| 2007/0094125 A1 | 4/2007 | Izyayev |
| 2007/0112669 A1 | 5/2007 | Snyder |
| 2007/0136093 A1 | 6/2007 | Rankin |
| 2007/0233512 A1 | 10/2007 | Gore |
| 2008/0046382 A1 | 2/2008 | Metz |
| 2008/0071600 A1 | 3/2008 | Johnson |
| 2008/0154650 A1 | 6/2008 | Matisonn et al. |
| 2008/0172214 A1 | 7/2008 | Col |
| 2008/0189141 A1 | 8/2008 | Gore et al. |
| 2008/0197185 A1 | 8/2008 | Cronin et al. |
| 2008/0255979 A1 | 10/2008 | Slutzky et al. |
| 2008/0262877 A1 | 10/2008 | Hargroder |
| 2008/0312969 A1 | 12/2008 | Raines |
| 2009/0024478 A1 | 1/2009 | Dixon |
| 2009/0076903 A1 | 3/2009 | Schwarzberg et al. |
| 2009/0105550 A1 | 4/2009 | Rothman |
| 2009/0150189 A1 | 6/2009 | Barron |
| 2009/0150192 A1 | 6/2009 | Gore et al. |
| 2009/0198525 A1 | 8/2009 | Gore et al. |
| 2009/0204441 A1 | 8/2009 | Read |
| 2009/0204446 A1 | 8/2009 | Simon |
| 2009/0240532 A1 | 9/2009 | Gore et al. |
| 2009/0259497 A1 | 10/2009 | Gore et al. |
| 2009/0265183 A1 | 10/2009 | Pollard et al. |
| 2009/0299773 A1 | 12/2009 | Gore et al. |
| 2009/0299774 A1 | 12/2009 | Gore et al. |
| 2009/0299775 A1 | 12/2009 | Gore et al. |
| 2009/0299776 A1 | 12/2009 | Gore et al. |
| 2009/0307015 A1 | 12/2009 | Gore et al. |
| 2010/0023354 A1 | 1/2010 | Gore et al. |
| 2010/0023384 A1 | 1/2010 | Pollard et al. |
| 2010/0049541 A1 | 2/2010 | Pollard et al. |
| 2010/0064737 A1* | 3/2010 | Upadhyaya et al. ............. 70/8 |

FOREIGN PATENT DOCUMENTS

| | | |
|---|---|---|
| AU | 2005/323847 | 2/2007 |
| AU | 2007/257457 | 1/2009 |
| AU | 2007/257458 | 1/2009 |
| AU | 2007/257546 | 1/2009 |
| AU | 2007/298514 | 2/2009 |
| AU | 2007/301521 | 5/2009 |
| CN | 2005/880047059 | 7/2007 |
| EP | 1050821 | 11/2000 |
| IL | 195735 | 12/2008 |
| IL | 195737 | 12/2008 |

| | | |
|---|---|---|
| IL | 195738 | 12/2008 |
| WO | 02/47074 | 6/2002 |
| WO | 03/007230 | 1/2003 |
| WO | 2007/141695 | 12/2007 |
| WO | 2007/141696 | 12/2007 |
| WO | 2007/141968 | 12/2007 |
| WO | 2008/035280 | 3/2008 |
| ZA | 98/02005 | 3/1998 |
| ZA | 98/11943 | 12/1998 |
| ZA | 2000/04682 | 9/2000 |
| ZA | 2004/02587 | 4/2004 |
| ZA | 2004/02891 | 4/2004 |
| ZA | 2004/05935 | 7/2004 |
| ZA | 2004/06294 | 8/2004 |
| ZA | 2006/01934 | 3/2006 |
| ZA | 2006/04673 | 6/2006 |
| ZA | 2006/04674 | 6/2006 |
| ZA | 2006/04687 | 6/2006 |
| ZA | 2006/04688 | 6/2006 |
| ZA | 2006/07789 | 9/2006 |
| ZA | 2006/07992 | 9/2006 |
| ZA | 2008-03529 | 4/2008 |
| ZA | 2008/04807 | 6/2008 |
| ZA | 2008/04808 | 6/2008 |
| ZA | 2008/04809 | 6/2008 |
| ZA | 2008/04810 | 6/2008 |
| ZA | 2008/04811 | 6/2008 |
| ZA | 2009/01740 | 3/2009 |

OTHER PUBLICATIONS

Discovery Vitality, "Discovery Vitality 2009" Sep. 12, 2008.*
Discovery Invest, "Group Retirement Plan Financial solutions for employees" Jan. 17, 2009.*
Baker et al., "Pay for Performance Incentive Programs in Healthcare: Market Dynammics and Business Process" Research Report 2003.*
PruHealth, "Individual Policy Document" Jul. 2008.*
Discovery Vitality, "Lesson Plans Grade 4 and 5" Apr. 2, 2008.*
HLC Financial Services, "Discovery News" Feb. 2009.*
Rintelman, Mary Jane, "Choice and cost-savings", Credit Union Management, vol. 19, No. 7, pp. 48, 50. Jul. 1996.
Woodard, Kathy, "stay healthy for real fun—and profit", Business First Columbus, vol. 12, No. 19, S.1, p. 13. Jan. 1996.
Spencer, Peter L., "New plan cuts health car costs in half (advantage of health care plan with high deductible)", Consumers' Research Magazine, vol. 76, No. 10, pp. 16. Oct. 1993.
Communuity Hearth Health Programs: Components, Ratio: John P. Elder, Thomas L. Schmid, Phyillis Dower and Sonja Hedlund; Journal of Public Health Policy; Palgrave Macmillian; 1993 winter; pp. 463-479.
Ferling ("New plans, New policies," Ferling, Rhona. Best's Review; Apr. 1993 p. 78).
"Plan Highlights for El Paso ISD" Salary Protection Insurance Plan, web-site—http://w3.unumprovident.com/enroll/elpasoisd/your_plan.htm, Mar. 3, 2008.
Consumer-Driven Health Plans Catch on as Myths Fall by Wayside (Sep. 4). PR Newswire, 1.
Art Technology Group; Discovery Holdings to exploit online interest in healthcare and life assurance with ATG commerce functionality; Revenue potential significant as 70% of Discovery members access the internet. (Oct. 28). M2 Presswire, 1.
"Absenteeism Control"; Cole, Thomas C. et al; Management Decision; London: 1992. vol. 20, Iss. 2; p. 12 (AC).
Saleem, Haneefa: "Health Spending Accounts"; Dec. 19, 2003; posted online at http://www.bls.gov/opub/cwc/print/cm20031022ar01p1.htm.
Insure.com; "The lowdown on life insurance medical exams"; Jun. 28, 2006; Imaged from the Internet Archive Waybackmachine on May 10, 2006 at http://web.archive.org/web/20060628231712/http://articles.moneycentral.msn. com/Insurance/Insureyourlife/thelowdownonlifeinsurancwemedicalexams.aspx.
definition of insurance, New Penguin Business Dictionary, Retreieved Oct. 26, 2008 from http://www.credoreference.com/entry/6892512/.
R.C. Olmstead, "Our Products" May 2008.
U.S. Appl. No. 09/876,311, filed Jun. 7, 2001.
U.S. Appl. No. 09/876,311, Final Rejection Oct. 23, 2006.
U.S. Appl. No. 09/876,311, Final Rejection Dec. 16, 2009.
U.S. Appl. No. 09/876,311, Non-Final Rejection Jan. 17, 2006.
U.S. Appl. No. 09/876,311, Non-Final Rejection Nov. 30, 2007.
U.S. Appl. No. 09/876,311, Non-Final Rejection Jul. 9, 2010.
U.S. Appl. No. 09/876,311, Requirement for Restriction May 18, 2007.
U.S. Appl. No. 09/876,311, Requirement for Restriction Jan. 2, 2009.
U.S. Appl. No. 09/876,311, Requirement for Restriction Jan. 16, 2009.
U.S. Appl. No. 09/876,311, Requirement for Restriction Aug. 10, 2009.
U.S. Appl. No. 09/876,311, Response to Office Action Jul. 19, 2006.
U.S. Appl. No. 09/876,311, Response to Office Action Feb. 23, 2007.
U.S. Appl. No. 09/876,311, Response to Office Action Jul. 17, 2007.
U.S. Appl. No. 09/876,311, Response to Office Action May 29, 2008.
U.S. Appl. No. 09/876,311, Response to Office Action Oct. 15, 2008.
U.S. Appl. No. 09/876,311, Response to Office Action Feb. 5, 2009.
U.S. Appl. No. 09/876,311, Response to Office Action May 28, 2009.
U.S. Appl. No. 09/876,311, Response to Office Action Sep. 10, 2009.
U.S. Appl. No. 09/876,311, Response to Office Action May 17, 2010.
U.S. Appl. No. 09/982,274, filed Oct. 17, 2001.
U.S. Appl. No. 09/982,274, Final Rejection Nov. 27, 2006.
U.S. Appl. No. 09/982,274, Final Rejection May 6, 2008.
U.S. Appl. No. 09/982,274, Final Rejection Jun. 9, 2009.
U.S. Appl. No. 09/982,274, Non-Final Rejection Mar. 3, 2006.
U.S. Appl. No. 09/982,274, Non-Final Rejection Aug. 9, 2007.
U.S. Appl. No. 09/982,274, Non-Final Rejection Oct. 17, 2008.
U.S. Appl. No. 09/982,274, Response to Office Action Sep. 6, 2006.
U.S. Appl. No. 09/982,274, Response to Office Action May 29, 2007.
U.S. Appl. No. 09/982,274, Response to Office Action Jan. 22, 2008.
U.S. Appl. No. 09/982,274, Response to Office Action Aug. 6, 2008.
U.S. Appl. No. 09/982,274, Response to Office Action Feb. 17, 2009.
U.S. Appl. No. 09/982,274, Notice of Appeal filed Sep. 9, 2009.
U.S. Appl. No. 09/982,274, Appeal Brief Filed Nov. 9, 2009.
U.S. Appl. No. 09/982,274, Reply Brief filed Apr. 2, 2010.
U.S. Appl. No. 12/112,165, filed Apr. 30, 2001.
U.S. Appl. No. 10/251,120, filed Sep. 20, 2002.
U.S. Appl. No. 10/251,120, Final Rejection Dec. 31, 2007.
U.S. Appl. No. 10/251,120, Final Rejection Jun. 25, 2009.
U.S. Appl. No. 10/251,120, Non-Final Rejection Mar. 29, 2007.
U.S. Appl. No. 10/251,120, Non-Final Rejection Jan. 5, 2009.
U.S. Appl. No. 10/251,120, Examiner Summary Oct. 21, 2009.
U.S. Appl. No. 10/251,120, Examiner Summary Jul. 6, 2010.
U.S. Appl. No. 10/251,120, Response to Office Action Sep. 28, 2007.
U.S. Appl. No. 10/251,120, Response to Office Action Oct. 7, 2008.
U.S. Appl. No. 10/251,120, Response to Office Action Apr. 6, 2009.
U.S. Appl. No. 10/251,120, Appeal Brief Filed Mar. 24, 2010.
U.S. Appl. No. 12/122,549, filed May 16, 2008.
U.S. Appl. No. 11/198,206, filed Aug. 5, 2005.
U.S. Appl. No. 11/198,206, Final Rejection Jan. 23, 2009.
U.S. Appl. No. 11/198,206, Non-Final Rejection Jun. 30, 2008.
U.S. Appl. No. 11/198,206, Response to Office Action Oct. 30, 2008.
U.S. Appl. No. 12/333,465, filed Dec. 12, 2008.
U.S. Appl. No. 12/262,266, filed Oct. 31, 2008.
U.S. Appl. No. 12/303,388, filed Dec. 4, 2008.
U.S. Appl. No. 12/303,391, filed Dec. 4, 2008.
U.S. Appl. No. 12/303,395, filed Dec. 4, 2008.
U.S. Appl. No. 12/303,399, filed Dec. 4, 2008.
U.S. Appl. No. 12/441,447, filed Mar. 16, 2009.
U.S. Appl. No. 10/344,176, filed Aug. 15, 2003.
U.S. Appl. No. 10/344,176, Final Rejection Oct. 30, 2008.
U.S. Appl. No. 10/344,176, Final Rejection Mar. 2, 2010.
U.S. Appl. No. 10/344,176, Non-Final Rejection Dec. 19, 2007.
U.S. Appl. No. 10/344,176, Non-Final Rejection Jun. 8, 2009.
U.S. Appl. No. 10/344,176, Response to Office Action May 19, 2008.
U.S. Appl. No. 10/344,176, Response to Office Action Mar. 2, 2009.
u1—Discovery Life "The Discovery life Portfolio", 62 pgs—2008.
u2—AFLAC "Personal Disability Income Protector", 6 pgs—Jul. 2003.
v1—Discovery Life—"Why Discovery Life"—4 pgs—May 29, 2008.

v2 GE Group Life Assurance Company—Group Short Term Disability Insurance—18 pgs, Oct. 29, 2004.
w1 Wenfin Financial Services, "Discovery Life Plan" www.bmlink.co.za/WenFininsurance—Website download, 58 pgs, Aug. 5, 2011.
w2 EconEdLink—"How Long is Your life?"—Tutorial from EconEdLink.com web-site, 4 pgs, posted Sep. 13, 2004.
x1 AFLAC—"Personal Cancer Indemnity Plan" Level 3, 11 pgs, Jun. 2005.
x2 Gendell Murray, "Retirement age Declines again in 1990s", Monthly Labor Review, 10 pgs, Oct. 2001.
u1—Discovery Life "Benefit version Reference Guide" Oct. 2008.
v1—Discovery Life—"Discovery life Group Risk LIFE PLAN".
w1 WenfinWebPages for Discovery Life Nov. 13, 2006.
x1 AFLAC—Discovery Life "Application for Discovery Card Protector" Nov. 2007.
u2—Discovery Life "The Disovery Life Portfolio" Nov. 20, 2008.
w2 Discovery Life "Discovery Individual LIE PLAN Guide" Aug. 4, 2009 EconEdLink—How Long is Your life?—Tutorial from EconEdLink.com web-site, posted Sep. 13, 2004.
x2 Discovery Life "The Discovery Life Portfolio" Jun. 2008.
u3 Discovery Invest Group Retirement {Plan Financial Solutions for employees: Oct. 17, 2009.
International Search Report for PCT/IB05/003842 filed Dec. 21, 2005 (WO2006/072822).
Written Opinion for PCT/IB05/003842 filed Dec. 21, 2005 (WO2006/072822).
International Preliminary Report on Patentability for PCT/IB05/003842 filed Dec. 21, 2005 (WO2006/072822).
International Search Report for PCT/IB07/051945 filed May 23, 2007 (WO2007/141695).
Written Opinion for PCT/IB07/051945 filed May 23, 2007 (WO2007/141695).
International Preliminary Report on Patentability for PCT/IB07/051945 filed May 23, 2007 (WO2007/141695).
International Search Report for PCT/IB07/051946 filed May 23, 2007 (WO2007/141696).
Written Opinion for PCT/IB07/051946 filed May 23, 2007 (WO2007/141696).
International Preliminary Report on Patentability for PCT/IB07/051946 filed May 23, 2007 (WO2007/141696).
International Search Report for PCT/IB07/051947 filed May 23, 2007 (WO2007/141697).
Written Opinion for PCT/IB07/051947 filed May 23, 2007 (WO2007/141697).
International Preliminary Report on Patentability for PCT/IB07/051947 filed May 23, 2007 (WO2007/141697).
International Search Report published Apr. 23, 2009 for PCT/IB07/051948 filed May 23, 2007 (WO2007/141698).
Written Opinion published Mar. 13, 2009 PCT/IB07/051948 filed May 23, 2007 (WO2007/141698).
International Preliminary Report on Patentability published Mar. 17, 2009 for PCT/IB07/051948 filed May 23, 2007 (WO2007/141698).
International Search Report for PCT/IB07/053906 filed Sep. 26, 2007 (WO2008/038232).
Written Opinion for PCT/IB07/053906 filed Sep. 26, 2007 (WO2008/038232).
International Preliminary Report on Patentability for PCT/IB07/053906 filed Sep. 26, 2007 (WO2008/038232).
International Search Report for PCT/IB01/01406 filed Aug. 8, 2001 (WO2002/013438).
International Preliminary Report on Patentability for PCT/IB01/01406 filed Aug. 8, 2001 (WO2002/013438).
International Search Report for PCT/IB2007/053760 filed Sep. 18, 2007 (WO2008/035280).
Written Opinion for PCT/IB2007/053760 filed Sep. 18, 2007 (WO2008/035280).
International Preliminary Report on Patentability for PCT/IB2007/053760 filed Sep. 18, 2007 (WO2008/035280).
Andrew Cohen; Putting Wellness to work; date Mar. 1, 1997; Athletic Business, pp. 1-7.
www.netpulse.net; Netpulsue Makes Working Out More than a Calorie-Burning Session; date Mar. 21, 1998, pp. 1-2.
www.netpulse.net; 24 Hour Fitness Partners with Netpulse; date Mar. 9, 1998; p. 1.
Trends in Medical Benefit Plan Design to Control Claim Costs; Record of Society of Actuaries; date 1982; vol. 8, No. 2, pp. 515-531.
David Richards, Return of Premium Disability Insurance; The Black Hole, dated Jul. 15, 2010, p. 1-4.
"Sidelines" WWD, p10—STIC Scientific and Technical Information Center, Feb. 3, 2000.
019 Co-pending U.S. Appl. No. 11/074,453, Final Office Action mailed Jul. 19, 2010.
015 Co-pending U.S. Appl. No. 11/189,647, Request for Continued Examination filed Jul. 19, 2010.
021 Co-pending U.S. Appl. No. 11/715,181, Response filed Aug. 12, 2010.
003-1 Co-pending U.S. Appl. No. 12/112,165, Non-final Office Action mailed Sep. 2, 2010.
004 Co-pending U.S. Appl. No. 10/251,120, Request for Continued Examination filed Oct. 6, 2010.
010 Co-pending U.S. Appl. No. 12/303,391, Non final Office Action mailed Nov. 24, 2010.
019 Co-pending U.S. Appl. No. 11/074,453, Response to final office action Dec. 20, 2010.
002 Co-pending U.S. Appl. No. 09/876,311, Non-final Office Action mailed Jul. 9, 2010.
U.S. Appl. No. 10/344,176, Response to Office Action Nov. 9, 2009.
U.S. Appl. No. 11/189,647, filed Jul. 26, 2005.
U.S. Appl. No. 11/189,647, Final Rejection May 11, 2010.
U.S. Appl. No. 11/189,647, Non-Final Rejection Aug. 14, 2009.
U.S. Appl. No. 11/189,647, Response to Office Action Feb. 15, 2010.
U.S. Appl. No. 10/819,256, filed Apr. 6, 2004.
U.S. Appl. No. 10/819,256, Final Rejection Jan. 6, 2009.
U.S. Appl. No. 10/819,256, Non-Final Rejection Mar. 18, 2008.
U.S. Appl. No. 10/819,256, Response to Office Action Sep. 18, 2008.
U.S. Appl. No. 11/097,947, filed Apr. 1, 2006.
U.S. Appl. No. 11/097,947, Non-Final Rejection Nov. 10, 2009.
U.S. Appl. No. 11/097,947, Final Rejection Jun. 7, 2010.
U.S. Appl. No. 11/097,947, Response to Office Action Mar. 10, 2010.
U.S. Appl. No. 10/818,574, filed Apr. 6, 2004.
U.S. Appl. No. 10/818,574, Non-Final Rejection Feb. 4, 2009.
U.S. Appl. No. 10/818,574, Response to Office Action May 4, 2009.
U.S. Appl. No. 11/074,453, filed Mar. 8, 2005.
U.S. Appl. No. 11/074,453, Non-Final Rejection Mar. 4, 2009.
U.S. Appl. No. 11/074,453, Requirement for Election Mar. 31, 2010.
U.S. Appl. No. 11/074,453, Notice of Non-compliant response Nov. 9, 2009.
U.S. Appl. No. 11/074,453, Response to Office Action Apr. 29, 2010.
U.S. Appl. No. 11/074,453, Response to Office Action Nov. 23, 2009.
U.S. Appl. No. 11/074,453, Response to Office Action Jul. 6, 2009.
U.S. Appl. No. 11/794,830, filed Jan. 22, 2008.
U.S. Appl. No. 11/794,830, Final Rejection Dec. 7, 2009.
U.S. Appl. No. 11/794,830, Non-Final Rejection May 27, 2009.
U.S. Appl. No. 11/794,830, Response to Office Action Sep. 28, 2009.
U.S. Appl. No. 11/794,830, Response to Office Action Apr. 7, 2010.
U.S. Appl. No. 11/903,607, filed Sep. 24, 2007.
U.S. Appl. No. 11/903,607, Final Rejection Jan. 28, 2010.
U.S. Appl. No. 11/903,607, Non-Final Rejection May 13, 2009.
U.S. Appl. No. 11/903,607, Response to Office Action Aug. 12, 2009.
U.S. Appl. No. 11/903,607, Response to Office Action Apr. 28, 2010.
U.S. Appl. No. 12/442,549, filed Mar. 24, 2009.
U.S. Appl. No. 12/477,179, filed Jun. 3, 2009.
U.S. Appl. No. 12/477,208, filed Jun. 3, 2009.
U.S. Appl. No. 12/477,213, filed Jun. 3, 2009.
U.S. Appl. No. 12/477,225, filed Jun. 3, 2009.
U.S. Appl. No. 12/477,189, filed Jun. 3, 2009.
U.S. Appl. No. 12/303,388, Non-Final Office Action mailed Mar. 11, 2011.
U.S. Appl. No. 11/715,181, filed Mar. 7, 2007.
U.S. Appl. No. 11/715,181, Non-Final Rejection Nov. 3, 2009.
U.S. Appl. No. 11/715,181, Non-Final Rejection May 12, 2010.
U.S. Appl. No. 11/715,181, Response to Office Action Feb. 3, 2010.
U.S. Appl. No. 12/303,395, Non-Final Rejection Jan. 24, 2011.
U.S. Appl. No. 12/912,009 filed Oct. 26, 2010.
U.S. Appl. No. 12/912,040 filed Oct. 26, 2010.

U.S. Appl. No. 12/112,165, Final Rejection Feb. 10, 2011.
U.S. Appl. No. 11/715,181, Response to Office Action Mar. 11, 2011.
U.S. Appl. No. 12/477,225, Non-final Office Action Mar. 25, 2011.
U.S. Appl. No. 12/122,549, Non-final Office Action Mar. 30, 2011.
U.S. Appl. No. 12/333,465, Non-final Office Action Mar. 30, 2011.
U.S. Appl. No. 11/189,647, Response to Office Action Apr. 18, 2011.
U.S. Appl. No. 12/303,395, Non-Final Rejection Apr. 29, 2011.
U.S. Appl. No. 12/303,391, Final Office Action May 11, 2011.
U.S. Appl. No. 10/344,176, Office Action May 16, 2011.
U.S. Appl. No. 11/074,453, Requirement for Election May 23, 2011.
U.S. Appl. No. 12/303,388 Response Jun. 8, 2011.
U.S. Appl. No. 12/303,395 Final Office Action Jun. 13, 2011.
U.S. Appl. No. 12/333,465, Response filed Jun. 30, 2011.
U.S. Appl. No. 12/122,549, Response filed Jul. 21, 2011.
U.S. Appl. No. 12/303,388 Final Office Action Jul. 5, 2011.
U.S. Appl. No. 11/189,647, Final Office Action Jun. 22, 2011.
U.S. Appl. No. 12/477,225, Non Final Office Action Jul. 8, 2011.
U.S. Appl. No. 12/441,447, Non Final Office Action Aug. 1, 2011.
U.S. Appl. No. 12/477,179, Non final office action Jul. 22, 2011.
U.S. Appl. No. 12/477,208, Non final office action Jul. 22, 2011.
U.S. Appl. No. 12/477,189 non final Office Action Aug. 5, 2011.
U.S. Appl. No. 12/303,391 RCE response Aug. 11, 2011.
U.S. Appl. No. 11/189,647, Response Aug. 12, 2011.
U.S. Appl. No. 12/303,388 Response Sep. 2, 2011.
U.S. Appl. No. 12/477,213 Non Final Office Action Aug. 9, 2011.
U.S. Appl. No. 12/442,549 non Final Office Action Sep. 19, 2011.
U.S. Appl. No. 12/477,225 Final Office Action Sep. 28, 2011.
U.S. Appl. No. 12/333,465, Final Office Action Oct. 4, 2011.
U.S. Appl. No. 12/477,179, Response filed Oct. 24, 2011.
U.S. Appl. No. 12/122,549, Final Office Action Oct. 6, 2011.
U.S. Appl. No. 11/074,453, Office Action Oct. 11, 2011.
U.S. Appl. No. 12/912,040, Office Action Oct. 20, 2011.
U.S. Appl. No. 12/441,447, Response filed Nov. 1, 2011.
U.S. Appl. No. 13/318,620, filed Nov. 3, 2011.

* cited by examiner

METHOD AND SYSTEM FOR OPERATING AN INSURANCE PROGRAM TO INSURE A PERFORMANCE BONUS OF A PERSON

FIELD OF THE INVENTION

The present invention generally relates to insurance systems, and more particularly relates to insuring performance bonuses of the insurance system members.

BACKGROUND OF THE INVENTION

Insurance products directed at protecting income of insured members are typically income replacement products or benefits. These products insure the policyholders or insured persons with respect to a fixed percentage of their salaries, for example, 75% of their salaries. These products generally do not take into consideration any performance related bonuses that may have been earned by the member.

SUMMARY OF THE INVENTION

In one embodiment, a method for operating an insurance program to insure a performance bonus of an insured person against an insured event is disclosed. The method comprises receiving a set of percentage bonus information. The set of percentage bonus information indicates a percentage of an annual salary received by the insured person as a performance bonus in a predetermined prior period. A set of health program status information associated with the insured person is received. At least a portion of an annual salary of the insured person payable as an insured performance bonus in an event of the insured event is determined based at least the set of percentage bonus information and the set of health program status information.

In another embodiment, an information processing system for operating an insurance program to insure a performance bonus of an insured person against an insured event is disclosed. The information processing system comprises a memory and a processor communicatively coupled to the memory. A performance bonus insuring manager is communicatively coupled to the memory and the processor. The performance bonus insuring manager is for receiving a set of percentage bonus information. The set of percentage bonus information indicates a percentage of an annual salary received by the insured person as a performance bonus in a predetermined prior period. A set of health program status information associated with the insured person is received. At least a portion of an annual salary of the insured person payable as an insured performance bonus in an event of the insured event is determined based at least the set of percentage bonus information and the set of health program status information.

The set of health program status information is determined by loading member application forms in a computer system managed by an insurance provider insuring the person. A default setting is for all members to be opted-in to receive rewards based on accumulated credit values exceeding predetermined values. One of a premium payment and a contribution payment is received at the computer system managed by the insurance provider from members of the medical insurance plan. The insurance provider undertakes liability in the medical insurance plan in response to receiving one of the premium payment and the contribution payment. At least one of relevant health services and assistance in defraying expenses incurred in connection with rendering such relevant health services is provided by the computer system managed by the insurance provider to members who pay at least one of the premium payment and the contribution payment. The computer system managed by the insurance provider defines at least one of a plurality of health-related facilities and a plurality of health-related services to be associated with the medical insurance plan. The computer system managed by the insurance provider offers the at least one of a plurality of health-related facilities and a plurality of health-related services to members of the medical insurance plan. The computer system managed by the insurance provider monitors usage of the at least one of a plurality of health-related facilities and a plurality of health-related services by at least the insured person. A credit value is allocated to the insured person according to the insured person's use of the at least one of a plurality of health-related facilities and a plurality of health-related services by the computer system managed by the insurance provider. The set of health program status information is based at least on the credit value. Rewards are allocated by the computer system managed by the insurance provider to the insured person who accumulates credit values exceeding predetermined values.

In yet another embodiment, a computer readable storage medium for operating an insurance program to insure a performance bonus of an insured person against an insured event is disclosed. The computer readable storage medium comprises instructions for performing a method comprising receiving a set of percentage bonus information. The set of percentage bonus information indicates a percentage of an annual salary received by the insured person as a performance bonus in a predetermined prior period. A set of health program status information associated with the insured person is received. At least a portion of an annual salary of the insured person payable as an insured performance bonus in an event of the insured event is determined based at least the set of percentage bonus information and the set of health program status information.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. Plural and singular terms are the same unless expressly stated otherwise.

Performance bonuses often form a significant portion of a person's income and many rely on this additional income to cover certain expenses or to supplement their salaries. It will be appreciated that a performance bonus is typically a portion (or greater) of the annual salary of person. In times of illness or disability, policyholders or insured persons may suffer not only from the shortfall on their salaries as paid out by the income replacement products but they may not receive any performance related bonuses that may otherwise have been paid to them. It follows that this can result in a significant loss in income during periods of illness or disability. Therefore, one or more embodiments of the present invention manage/operate an insurance system that insures a performance bonus of an insured person against a predefined insured event occurring in a particular reference year, as will be discussed in greater detail below.

Various embodiments of the present invention are advantageous because they provide a method of operating an insurance program to insure a performance bonus of an insured person against a predetermined or predefined event occurring in a particular reference year. In one embodiment, the method comprises receiving percentage bonus information indicative of a percentage of an annual salary received by the insured person as a performance bonus in a predetermined period prior to the particular reference year. Health program status information associated with the insured person is received. At least the percentage bonus information and the health program status information are used to determine a portion or more of an annual salary, of the insured person in the particular reference year, payable as an insured performance bonus in the event of the predetermined or predefined event.

The method can comprise receiving information indicative of the annual salary of the insured person in the particular reference year.

The method can also include determining the percentage bonus information. It follows that determining the annual percentage bonus information can comprise receiving percentage data indicative of the percentage of the annual salary which the insured person received as a performance bonus in each year in the predetermined period prior to the particular reference year and determining an average percentage of the percentage data received.

In one embodiment, the predetermined period can be three years and the predetermined or predefined event can be illness and/or disability.

The method can comprise determining health program status information as a percentage corresponding to a particular status of the insured person in terms of a health program benefit.

It should be noted that the method can comprise using the determined insured performance bonus to determine an insurance premium payable by the insured person.

In another embodiment, a system for operating an insurance program to insure a performance bonus of an insured person against a predetermined or predefined event occurring in a particular reference year. The system comprises a percentage bonus determining module adapted to determine percentage bonus information indicative of a percentage of an annual salary received by the insured person as a performance bonus in a predetermined period prior to the particular reference year. A health program status determining module is adapted to determine health program status information associated with the insured person. An insured performance bonus determining module is adapted to use at least the percentage bonus information and the health program status information to determine a portion or more of an annual salary, of the insured person in the particular year, payable as an insured performance bonus in the event of the predetermined or defined event.

The percentage bonus determining module can further determine information indicative of the current annual salary of the insured person.

Additionally, the percentage bonus determining module determines percentage data indicative of the percentage of the annual salary which the insured person received as a performance bonus in each year in a predetermined period prior to a current year and determines an average percentage of the percentage data received.

The predetermined period can be three years and the insured event, in one embodiment, is one or more of death, illness, and disability.

The insured performance bonus determining module can use the health program status information to determine a percentage corresponding to a particular status of the insured person in terms of the health program.

The system can use the determined insured performance bonus to determine an insurance premium payable by the insured person.

Operating Environment

Figure 1:
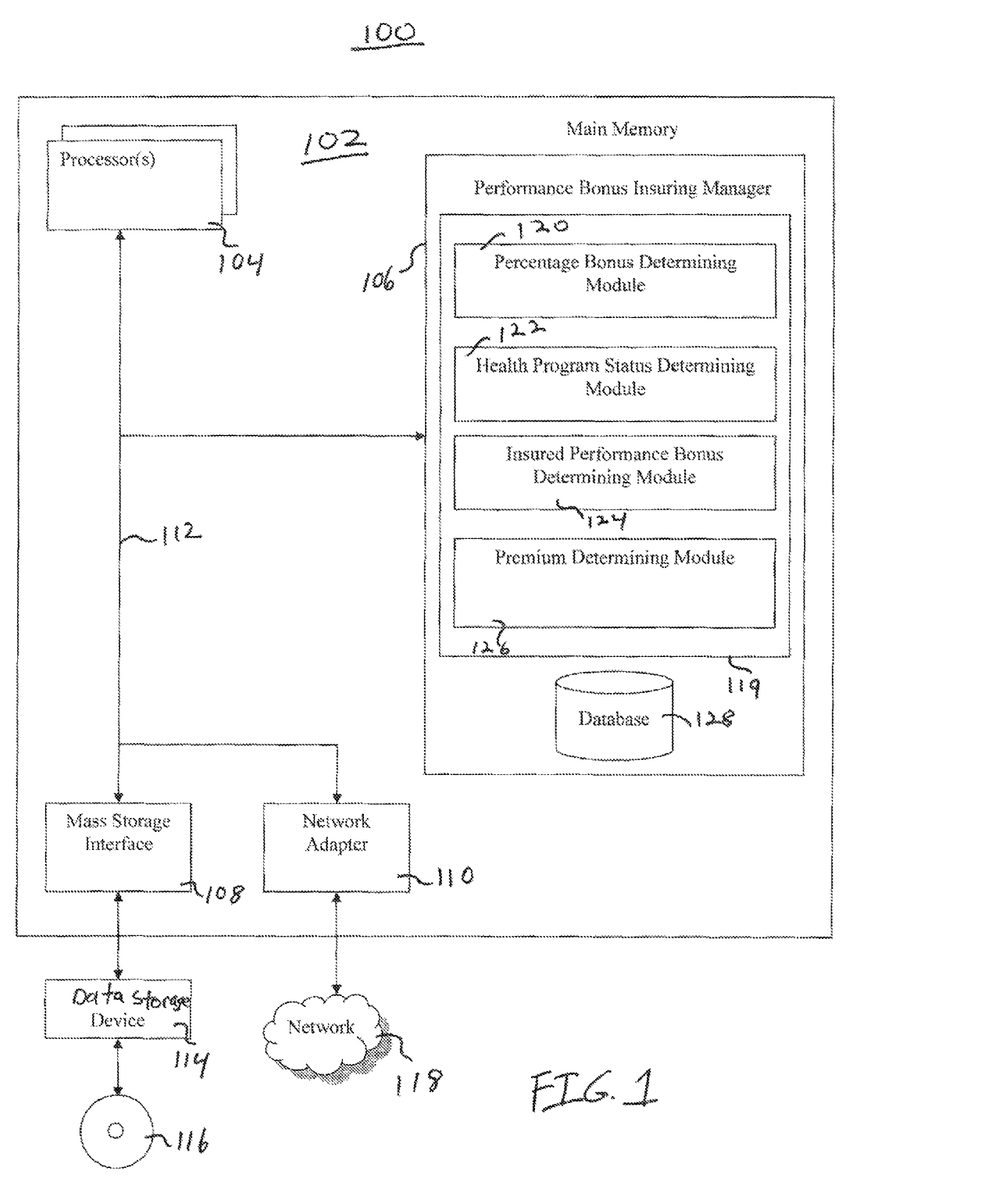
FIG. 1 illustrates an operating environment according to one embodiment of the present invention.

FIG. 1 shows an operating environment according to one embodiment of the present invention. In particular, FIG. 1 illustrates an information processing system 100 for managing/operating an insurance program/system. This system 100 can be managed and/or operated by the insuring company and/or a third-party. In one or more embodiments, the system 100 of FIG. 1, among other things, manages/operates an insurance system that insures a performance bonus of an insured person against a predefined insured event occurring in a particular reference year.

For brevity, the person whose performance bonus is insured will be referred to as the insured person, insured, or policyholder. However, it should be noted that the policyholder need not necessarily be the insured or insured person. Also, the insured event is, for example death, illness, and/or disability of the insured person. However, insured events can also refer to other types of events as well. The particular reference year can be a current year in which the insured event occurs, or any other year for that matter.

The information processing system 100 is based upon a suitably configured processing system adapted to implement one or more embodiments of the present invention. Any suitably configured processing system is similarly able to be used as the information processing system 100 by embodiments of the present invention.

The information processing system 100 comprises a computer 102. The computer 102 has one or more processor(s)

104 that are connected to a main memory 106, a mass storage interface 108, and network adapter hardware 110. A system bus 112 interconnects these system components. The mass storage interface 108 is used to connect mass storage devices, such as data storage device 114, to the information processing system 100. One specific type of data storage device is an optical drive such as a CD/DVD drive, which can be used to store data to and read data from a computer readable medium or storage product such as (but not limited to) a CD or DVD 116. Another type of data storage device is a data storage device configured to support, for example, NTFS type file system operations or any other type of file system. The network adapter hardware 110 is used to provide an interface to one or more networks 118. Further embodiments of the present invention are able to be adapted to work with any data communications connections including present day analog and/or digital techniques or via a future networking mechanism.

The system 100 comprises a plurality of components or modules that correspond to the functional tasks to be performed by the system 100. In this regard, "module" in the context of this discussion will be understood to include an identifiable portion of code, computational or executable instructions, data, or computational object to achieve a particular function, operation, processing, or procedure. It follows that a module need not be implemented in software; a module can be implemented in software, hardware, or a combination of software and hardware. Further, the modules need not necessarily be consolidated into one device or system but can be spread across a plurality of devices or systems to achieve desired functionality.

In the embodiment shown in FIG. 1 the main memory 106 comprises one or more modules. For example, FIG. 1 shows that the main memory 106 comprises a percentage bonus determining module 120, a health program status determining module 122, an insured performance bonus determining module 124, and a premium determining module 126. The main memory 106 also comprises one or more databases 128. One or more of these modules 120, 122, 124, 126 can reside within a performance bonus insuring manager 119. As discussed above, one or more of these modules can also be implemented in hardware and/or in software and can also reside on one or more information processing systems as well.

In one embodiment, the percentage bonus determining module 120 determines percentage bonus information indicative of a percentage of an annual salary received by the insured person as a performance bonus in a predetermined period prior to the particular reference year. It will be appreciated that the module 120 is arranged to receive percentage data indicative of the percentage of the annual salary that the insured received as a performance bonus in each year in the predetermined period prior to the reference year. The predetermined period, in one embodiment, is three years prior to the reference year, but can be any other suitable time period. The module percentage bonus determining module 120 is then further arranged to determine an average percentage of the percentage data received. These aspects of the percentage bonus determining module 120 are discussed in greater detail below.

The health program status determining module 122, in one embodiment, determines health program status information associated with the insured. The health program status information, in one embodiment, comprises a predetermined percentage corresponding to a particular status of the insured person in terms of a health program benefit. This is illustrated with reference to Table 1 below.

TABLE 1

| Health Benefit Status | | | | |
|---|---|---|---|---|
| Blue | Bronze | Silver | Gold | Diamond |
| 10% | 20.% | 50% | 75% | 100% |

In one embodiment, with reference to Table 1 above, the health program status determining module 122 determines that the status of the insured in terms of the health program benefit is, for example, silver. It follows that the health program status determining module 122 then determines that the percentage corresponding to the determined status is 50%.

In one or more embodiments, the health program benefit can be linked to a medical insurance program that the insured belongs to. In one embodiment, the health program benefit can be a wellness program such the Vitality™ program. One example of a wellness program is given in the commonly owned South African Patent Number ZA 99/1746 and the commonly owned U.S. patent application Ser. No. 09/982,274, which are both hereby incorporated by reference in their entireties.

The health program status determining module 122 can be communicatively coupled to the medical insurance program or operating systems associated therewith to obtain information therefrom. Instead, or in addition, the database 128 can store at least health program status information associated with insured persons.

The insured performance bonus determining module 124, in one embodiment, uses at least the percentage bonus information and the health program status information to determine a portion (or greater) of an annual salary of the insured person in the particular reference year, payable as an insured performance bonus (discussed in greater detail below). It should be noted that the insured performance bonus determining module 124 is adapted to receive information indicative of the annual salary of the insured in the particular reference year.

The premium determining module 126 determines a premium payable as correlated with the determined insured performance bonus.

It should be noted that although only one CPU 104 is illustrated for the computer 102, computer systems with multiple CPUs can be used equally effectively. Further embodiments of the present invention incorporate interfaces that each include separate, fully programmed microprocessors that are used to off-load processing from the CPU 104. An operating system included in the main memory is a suitable multitasking operating system such as, but not limited to, the Linux, UNIX, Windows XP, or Windows Server operating system. Further embodiments of the present invention are able to use any other suitable operating system. Some embodiments of the present invention utilize architectures, such as an object oriented framework mechanism, that allow instructions of the components of operating system to be executed on any processor located within the information processing system 100.

Although the exemplary embodiments of the present invention are described in the context of a fully functional computer system, those skilled in the art will appreciate that embodiments are capable of being distributed as a program product via CD, DVD, CD-ROM, other forms of recordable media, or other forms of computer readable storage media, for example, the computer readable medium or storage product 116 of FIG. 100.

Insuring Performance Bonus

As discussed above, various embodiments of the present invention manage/operate an insurance system that insures a performance bonus of an insured person against a predefined insured event occurring in a particular reference year. The following is a more detailed discussion with respect to insuring a performance bonus. Various embodiments for insuring a performance bonus are given with respect to operational flow diagrams in FIGS. 2-4. These embodiments are discussed with respect to the system 100 of FIG. 1. However, these embodiments are also applicable to other systems (not illustrated) as well.

Figure 2:
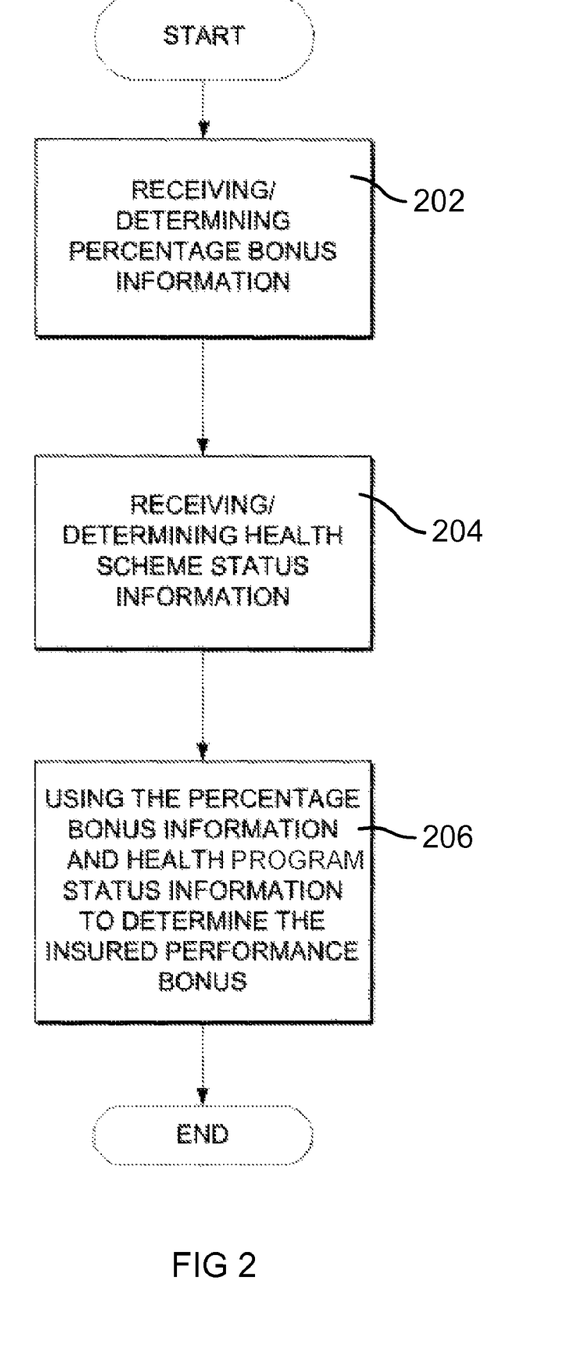
FIG. 2 is an operational flow diagram illustrating one example of at least determining an insured performance bonus payable to an insured in the event of the insured becoming ill and/or disabled according to one embodiment of the present invention.

Referring to FIG. 2, an operational flow diagram for at least determining an insured performance bonus payable to an insured in the event of the insured becoming ill and/or disabled is shown. The performance bonus insuring manager 119, at step 202 via the percentage bonus determining module 120, receives percentage bonus information indicative of a percentage of an annual salary received by the insured person as a performance bonus in a predetermined period prior to the particular reference year.

Figure 3:
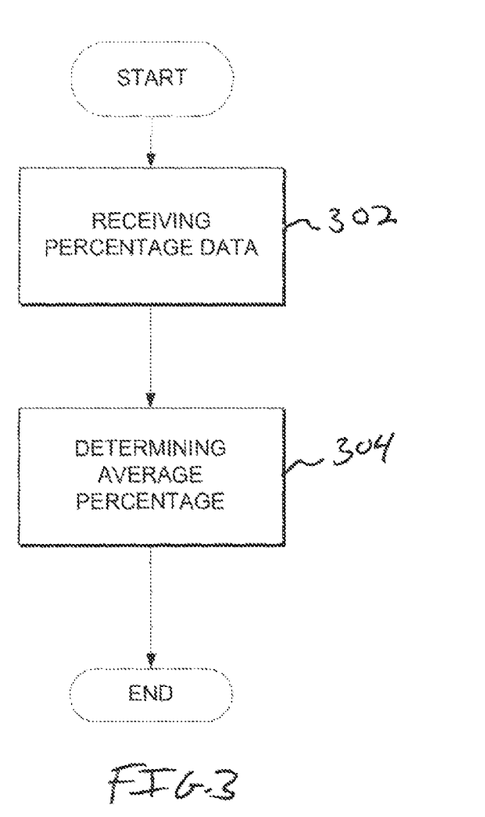
FIG. 3 is an operational flow diagram illustrating a more detailed example of receiving/determining percentage bonus information according to one embodiment of the present invention.

Turning now to FIG. 3, a more detailed discussion of step 202 in FIG. 2 is given. The embodiment shown in FIG. 3 is discussed with reference to Table 2 below.

TABLE 2

| Year | Salary | Bonus | Bonus % | |
|------|--------|-------|---------|---|
| 2006 | R 400,000 | R 100,000 | 25% | |
| 2007 | R 440,000 | R 44,000 | 10% | Average: 16.7% |
| 2008 | R 475,200 | R 71,280 | 15% | |

FIG. 3 shows that the percentage bonus determining module 120, at step 302, receives percentage data indicative of the percentage of the annual salary that the insured person received as a performance bonus in each year for three years (or any other number of years) prior to the particular reference year. Referring to Table 2, where assuming the reference year is 2009, the embodiment shown in FIG. 3 comprises receiving, at step 302, the percentages of the annual salaries received as bonuses for the years 2006 to 2008 which are: 25% for 2006, 10% for 2007 and 15% for 2008.

The percentage bonus determining module 120, at step 304, then determines an average percentage of the percentage data received. It follows that that the average percentage for the period 2006 to 2008 from Table 2 is 16.7%.

Returning to FIG. 2, the performance bonus insuring manager 119, at step 204 via the heath program status determining module 122, receives health program status information associated with the insured person. As discussed above, where the heath program status determining module 122 determines, for example, that the insured has a silver status, the percentage corresponding to the status is 50%.

The performance bonus insuring manager 119 then advantageously uses, at step 206 via the insured performance bonus determining module 124, at least the percentage bonus information and the health program status information to determine the insured performance bonus.

Figure 4:
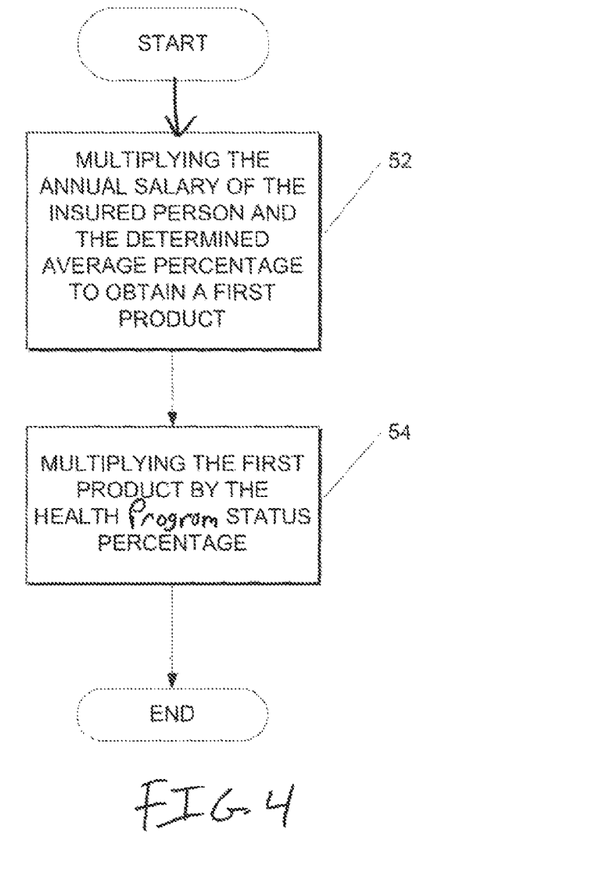
FIG. 4 is an operational flow diagram illustrating a more detailed example of using the percentage bonus information and health program status information to determine an insured performance bonus according to one embodiment of the present invention.

Turning now to FIG. 4, a more detailed operational flow diagram of step 206 in FIG. 2 is shown. The insured performance bonus determining module 124, at step 402, multiplies the annual salary of the insured in the particular reference year, for example 2009, by the determined average percentage discussed above (for 2006 to 2008) to obtain a first product. So where the annual salary of the insured in 2009 is R500 000, the first product is R500 00×16.7%=R83 500.

The insured performance bonus determining module 124, at step 404, then multiplies the first product by the percentage corresponding to the status of the insured. So where the percentage is 50% as discussed above, the insured performance bonus can be determined as R83 500×50%=R41 750.

The determined insured performance bonus is then payable to the insured should he/she die and/or become ill and/or disabled. As can be seen from the above discussion, various embodiments of the present invention provide a convenient way to protect an insured person against loss of his/her performance bonus in the event of death, illness, and/or disability, for example.

Non-Limiting Examples

The present invention as would be known to one of ordinary skill in the art could be produced in hardware or software, or in a combination of hardware and software. However in one embodiment the invention is implemented in software. The system, or method, according to the inventive principles as disclosed in connection with the preferred embodiment, can be produced in a single computer system having separate elements or means for performing the individual functions or steps described or claimed or one or more elements or means combining the performance of any of the functions or steps disclosed or claimed, or can be arranged in a distributed computer system, interconnected by any suitable means as would be known by one of ordinary skill in the art.

According to the inventive principles as disclosed in connection with the preferred embodiment, the invention and the inventive principles are not limited to any particular kind of computer system but can be used with any general purpose computer, as would be known to one of ordinary skill in the art, arranged to perform the functions described and the method steps described. The operations of such a computer, as described above, can be according to a computer program contained on a medium for use in the operation or control of the computer, as would be known to one of ordinary skill in the art. The computer medium, which can be used to hold or contain the computer program product, can be a fixture of the computer such as an embedded memory or can be on a transportable medium such as a disk, as would be known to one of ordinary skill in the art.

The invention is not limited to any particular computer program or logic or language, or instruction but can be practiced with any such suitable program, logic or language, or instructions as would be known to one of ordinary skill in the art. Without limiting the principles of the disclosed invention any such computing system can comprise, inter alia, at least a computer readable medium allowing a computer to read data, instructions, messages or message packets, and other computer readable information from the computer readable medium. The computer readable medium can comprise non-volatile memory, such as ROM, Flash memory, floppy disk, Disk drive memory, CD-ROM, and other permanent storage. Additionally, a computer readable medium can include, for example, volatile storage such as RAM, buffers, cache memory, and network circuits.

Furthermore, the computer readable medium can comprise computer readable information in a transitory state medium such as a network link and/or a network interface, including a wired network or a wireless network that allows a computer to read such computer readable information.

Although specific embodiments of the invention have been disclosed, those having ordinary skill in the art will understand that changes can be made to the specific embodiments without departing from the spirit and scope of the invention.

The scope of the invention is not to be restricted, therefore, to the specific embodiments, and it is intended that the appended claims cover any and all such applications, modifications, and embodiments within the scope of the present invention.

What is claimed is:

1. A method for operating an insurance program to insure a performance bonus of an insured person against an insured event using at least one computer server, the method comprising:
   receiving a set of percentage bonus information into non-transitory storage medium connected to the at least one computer server, wherein the set of percentage bonus information includes salary information and a percentage of an annual salary received by the insured person as a performance bonus in at least one predetermined prior time period;
   receiving into the storage medium a set of health program status information relating to usage of at least one of a plurality of health-related facilities and a plurality of health-related services by the insured person;
   calculating, using the at least one computer server, a percentage of an annual salary value based upon the received set of percentage bonus information;
   calculating, using the at least one computer server, a percentage usage value based upon the received set of health program status information;
   calculating, using the at least one computer server, an insured performance bonus by multiplying salary data by the calculated percentage of annual salary value multiplied by the calculated percentage usage value; and
   allocating, using the at least one computer server, the calculated insured performance bonus to the insured person.

2. The method of claim 1, wherein the set of percentage data indicates the percentage of the annual salary which the insured person received as a performance bonus in a plurality of prior time periods, and the percentage of an annual salary value is calculated as an average percentage of the percentage data received for the plurality of prior time periods.

3. The method of claim 2, wherein each of the at least one prior time period is a year.

4. The method of claim 1, wherein the insured event is at least one of a death, an illness, and a disability.

5. The method of claim 1, wherein the health program is a wellness program, and the percentage usage value calculated corresponds to a particular status of the insured person with respect to the wellness program.

6. The method of claim 1, further comprising:
   determining, using the at least one computer server and based on the insured performance bonus, an insurance premium payable by the insured person.

7. The method of claim 1, wherein the received set of percentage bonus information corresponds to three predetermined prior time periods.

8. The method of claim 1, wherein the performance bonus is associated with work performance and does not including compensation for illness.

9. A method for operating an insurance program to insure a performance bonus of an insured person against an insured event using at least one computer server, the method comprising:
   receiving a set of percentage bonus information into non-transitory storage medium connected to the at least one computer server, wherein the set of percentage bonus information includes salary information and a percentage of an annual salary received by the insured person as a performance bonus in a plurality of prior time periods, the performance bonus associated with work performance and not including compensation for illness;
   receiving into the storage medium a set of wellness health program status information relating to usage of at least one of a plurality of health-related facilities and a plurality of health-related services by the insured person;
   calculating, using the at least one computer server, a percentage of an annual salary value representative of the received set of percentage bonus information for the plurality of prior time periods;
   calculating, using the at least one computer server, a status grouping of the insured based upon the received set of wellness health program status information, and using the status grouping to assign a percentage usage value to the insured; and
   calculating, using the at least one computer server, an insured performance bonus by multiplying salary data by the calculated percentage of annual salary value multiplied by the calculated percentage usage value; and
   allocating, using the at least one computer server, the calculated insured performance bonus to the insured person.

10. The method of claim 9, wherein each of the prior time periods are years.

11. The method of claim 9, wherein the insured event is at least one of a death, an illness, and a disability.

12. The method of claim 9, further comprising:
   determining, using the at least one computer server and based on the insured performance bonus, an insurance premium payable by the insured person.

13. An apparatus for operating an insurance program to insure a performance bonus of an insured person against an insured event, comprising:
   at least one computer server;
   software executable upon non-transitory storage media connected to said at least one computer server, the software configured to
   (a) receive a set of percentage bonus information into non-transitory storage medium connected to the at least one computer server, wherein the set of percentage bonus information includes salary information and a percentage of an annual salary received by the insured person as a performance bonus in at least one predetermined prior time period;
   (b) receive into the storage medium a set of health program status information relating to usage of at least one of a plurality of health-related facilities and a plurality of health-related services by the insured person;
   (c) calculate a percentage of an annual salary value based upon the received set of percentage bonus information;
   (d) calculate a percentage usage value based upon the received set of health program status information; and
   (e) calculate an insured performance bonus by multiplying salary data by the calculated percentage of annual salary value multiplied by the calculated percentage usage value; and
   (f) allocate the calculated insured performance bonus to the insured person.

* * * * *